United States Patent
Price et al.

[19]

[11] Patent Number: 6,158,603
[45] Date of Patent: Dec. 12, 2000

[54] TAMPER EVIDENT CLOSURE FOR BEVERAGES

[75] Inventors: Michael L. Price, Mountain Top; Edward Generose, Hazleton, both of Pa.

[73] Assignee: Zapata Innovative Closures Inc., Coconut Grove, Fla.

[21] Appl. No.: 09/411,970

[22] Filed: Oct. 4, 1999

Related U.S. Application Data

[63] Continuation of application No. 09/009,278, Jan. 20, 1998, Pat. No. 5,984,125.

[51] Int. Cl.[7] .................................................. B65B 7/28
[52] U.S. Cl. ........................... 215/44; 215/253; 215/305
[58] Field of Search ........................... 215/216, 217, 215/235, 253, 254, 305, 330, 331, 44

[56] References Cited

U.S. PATENT DOCUMENTS

| | | | |
|---|---|---|---|
| 1,858,163 | 5/1932 | De Boissac | 215/331 |
| 2,156,258 | 5/1939 | Atwood . | |
| 2,423,582 | 7/1947 | Coleman . | |
| 3,415,403 | 12/1968 | Bardell . | |
| 3,825,144 | 7/1974 | Wiedmer . | |
| 3,899,097 | 8/1975 | Aichinger | 215/253 |
| 3,963,139 | 6/1976 | Gach | 215/305 |
| 3,973,941 | 8/1976 | Augeri | 215/44 X |
| 4,093,096 | 6/1978 | Augros | 215/331 X |
| 4,328,906 | 5/1982 | Walter . | |
| 4,331,247 | 5/1982 | Mumford . | |
| 4,373,641 | 2/1983 | Banich, Sr. et al. | 215/331 |
| 4,399,920 | 8/1983 | Swartzbaugh et al. . | |
| 4,485,932 | 12/1984 | Kusz . | |
| 4,501,371 | 2/1985 | Smalley . | |
| 4,548,329 | 10/1985 | Curry | 215/216 |
| 4,727,998 | 3/1988 | Simon | 215/230 |
| 5,165,559 | 11/1992 | Kusz . | |
| 5,511,677 | 4/1996 | Oder . | |
| 5,513,763 | 5/1996 | Adams et al. | 215/254 |
| 5,593,054 | 1/1997 | Glynn . | |
| 5,687,863 | 11/1997 | Kusz . | |
| 5,697,509 | 12/1997 | Hayes | 215/235 |

FOREIGN PATENT DOCUMENTS

WO99/36326  7/1999  WIPO .

*Primary Examiner*—Stephen K. Cronin
*Attorney, Agent, or Firm*—Philip E. Roux; Clifford Chance; Rogers & Wells LLP

[57] ABSTRACT

The tamper evident closure of the present invention includes a twist cap made of plastic that comprises a top portion and an interior sealing means which coacts with the rim of the container neck to provide a gas-tight seal. The top portion also has an annular depending skirt which includes an interior retaining means to coact with an exterior retaining means on the neck finish of the container. The exterior retaining means of the container has a positive stopping means to coact with interior retaining means of the cap so that when the cap is screwed onto the container neck the positive stopping means is engaged at a predetermined level of sealing force and capping torque. The depending skirt also includes locking means which lock the cap into place after the container is sealed. The locking means coacts with the positive stopping means on the container to prevent the cap from being unscrewed or twisted off the container after it has been screwed onto the container neck. The locking means are disengaged only after a tamper evident means is engaged to indicate that the container has been opened. The tamper evident means preferably comprises a hinged portion of the cap which must be lifted to open the container, thus providing an indication that the container has been opened or tampered with.

8 Claims, 6 Drawing Sheets

TAMPER EVIDENT CLOSURE FOR BEVERAGES

This application is a continuation of Ser. No. 09/009,278, filed Jan. 20, 1998, U.S. Pat. No. 5,984,125.

FIELD OF THE INVENTION

The present invention relates to tamper evident closures which provide an effective seal for and indicate the condition of containers or bottles which may contain non-carbonated beverages or carbonated beverages such as soft drinks or beer. More particularly, the closure of the present invention includes a plastic twist cap with a hinged portion which must be lifted to open the container or bottle and thus provides a clear and unequivocal indicator of the condition of the container or bottle, e.g. that it has been opened or tampered with.

BACKGROUND OF THE INVENTION

Closures such as crown seals or caps are routinely used and are well known in the art for sealing the openings of containers or bottles which typically contain carbonated or other beverages. With respect to crown seals, they are commonly formed of metal sheet material and comprise a top and a sidewall with a flared skirt. The skirt includes a plurality of flutes which extend around the circumference thereof at spaced intervals. When applied to cover an open end of a bottle, these flutes are bent or crimped at the points of intersection between the top and the skirt, gripping a bead at the upper rim of the bottle opening for sealing.

To obtain a seal of sufficient strength which will withstand the pressure of the contained carbonated or other beverages, a metal such as steel typically is used to form crown seals. In order to provide an effective gas-tight seal, metal crown seals generally will include a sealing gasket or liner which is attached to the inside of the top of the crown seal. Such a liner commonly is made of plastic or a similar resilient material which provides a seal between the bottle opening and the metal crown seal when it is applied to the bottle.

In recent years metal "twist-off" crown seals have become more popular and are used by numerous beverage manufacturers. The twist-off crown seal generally includes internal threads which are formed when the flutes of the crown seal are bent or crimped onto the external threads located near the upper rim of the container or bottle opening. The twist-off crown seal is removed from the bottle without the use of a bottle opener by rotating the crown seal to unthread it from the bottle. The metal flutes are relatively sharp, however, and can be uncomfortable when grasped by a consumer when the bottle is picked up or opened. Particularly with the twist-off crown seal design, the sharp edges of the flutes can be painful as the crown seal is removed. With respect to tamper evidence, moreover, crown seals, particularly twist-off crown seals, can easily be replaced onto the bottles after being removed with little or no evidence that the bottles have been opened or tampered with.

As a result of the disadvantages and limitations noted for metal crown seals, the use of plastic closures for bottles containing pressurized beverages has been proposed in the prior art. Such prior art designs for plastic closure caps have several advantages over metal crown seals. Among the advantages are ease of use, low torque removal, better protection for the bottle finish, less possibility of injuring the user's hand during removal, less possibility of injuring others if carelessly discarded, and a potential for biodegradability.

Despite these advantages, however, the prior art plastic closures have suffered from a number of disadvantages which have limited their use in commercial applications. For example, in order to provide sufficient sealing integrity to ensure a gas-tight seal for extended periods of time, some plastics caps have been made to incorporate an inner skirt that enters the bottle mouth to pressure seal the contained beverage. Other plastic caps have included an outer strengthening collar for holding the closure on the bead of the bottle mouth. Still other plastic closures have combined the features of screwing completely onto the bottle for a tight fit while employing an inner skirt for added pressure seal. To incorporate these features, additional material, manufacturing steps and/or specialized machinery is required which increases the time and cost of manufacturing the caps sealing containers with such caps.

Another disadvantage of the prior art plastic closures is that the closures can be relatively easily removed by hand by persons tampering with bottles. Furthermore, with these prior art designs, there is no convenient way by which it is possible to determine or detect whether a bottle has been previously opened by an unauthorized person and then resealed.

Thus, metal crown seals and the prior art plastic closures for bottles or other containers are beset with drawbacks and problems. All of the above-mentioned disadvantages are minimized or eliminated by the present invention.

SUMMARY OF THE INVENTION

The present invention provides a new and unique tamper evident closure comprising a twist cap and a container such as a bottle. The container may contain non-carbonated beverages or carbonated beverages such as soft drinks or beer. The twist cap preferably is made of plastic, and can be made to have the appearance of a metal crown seal which typically is used to seal bottles containing carbonated or non-carbonated beverages. The closure of the present invention provides a gas tight seal and can easily be opened without the discomfort which can occur when opening conventional twist-off metal crown seals. The closure also includes a tamper evident means which provides clear indication of the condition of the container—i.e., whether the container has been previously opened or tampered with.

Generally, the tamper evident closure of the present invention includes a twist cap made of plastic which includes a top portion and an interior sealing means which coacts with the rim of the container neck to provide a gas-tight seal. The top portion also has an annular depending skirt which engages the neck of the container for closure thereof. The depending skirt includes an interior retaining means to coact with an exterior retaining means on the neck finish of the container so that when the cap is screwed onto the container neck, the cap is pulled onto the neck and the interior sealing means of the cap is pressed against the rim of the neck with sufficient force to provide a gas-tight sealing engagement. The exterior retaining means of the container has a positive stopping means to coact with interior retaining means of the cap so that when the cap is screwed onto the container neck the positive stopping means is engaged at a predetermined level of sealing force and capping torque. The depending skirt also includes locking means which lock the cap into place after the container is sealed. The locking means coacts with the positive stopping means on the container to prevent the cap from being unscrewed or twisted off the container after it has been screwed onto the container neck. The locking means are disengaged only after a tamper evident means is engaged to indicate that the container has been opened.

Preferably the tamper evident means comprises a hinged portion of the cap which must be lifted to open the container, thus providing an indication that the container has been opened or tampered with. The hinged portion comprises a portion of the cap and depending skirt which includes a hinge which runs straight across the top portion of the cap and two lines of weakness in the depending skirt which run straight down the side of the skirt from the ends of the hinge to the bottom of the skirt. The hinged portion also includes a handle which is used to pull the hinged portion in an upward direction when the container is being opened, thus breaking the lines of weakness and providing evidence that the container has been opened or tampered with.

In a preferred embodiment the interior retaining means of the cap comprises of one or more projections or threads on the interior wall of the skirt, and the exterior retaining means and positive stopping means comprise suitable coacting projections or threads on the neck finish of the container. The locking means of the depending skirt comprises of one or more flaps projecting from the interior wall of the portion of the skirt which is included in the hinged portion of the cap. The flaps sufficiently deflect when the cap is screwed onto the container neck to allow application and sealing of the cap onto the container. When an attempt is made to untwist or unscrew the cap off of the container without first lifting the hinged portion of the cap, the flaps engage the positive stopping means to prevent the cap from being unscrewed or twisted off the container. The flaps are disengaged only after the hinged portion of the cap is lifted from the container. As the hinged portion is lifted from the container, pressure inside the container is released, thus yielding a safe opening for the consumer. The hinged portion then remains raised, thus providing evidence that the container has been opened or tampered with. Once the hinged portion is raised and the flaps are disengaged, the cap may be safely opened by untwisting it off the container.

In the preferred embodiment the interior sealing means of the cap comprises a liner which rests between the top portion of the cap and the interior retaining means of the cap before the cap is applied to the container. The liner preferably is made of ethylene vinyl acetate or other similar polyoelifins such as polyvinylchloride (PVC). The diameter of the liner preferably is about the same as the interior diameter of the depending skirt. When the cap is applied to the container, the liner initially rests on the top of the rim of the container neck. As the cap is screwed further onto the container for a sealing engagement, the outer circumference of the liner is caught and compressed between the rim of the container neck and the interior corner of the cap where the top portion meets the depending skirt, thus providing a gas-tight seal of the container.

Thus, the closure of the present invention are designed to be used with containers such as bottles which contain carbonated beverages to provide a gas-tight seal, and, at the same time, indicate the condition of the container to thereby provide evidence of tampering. The closure of the present invention further provides a low-cost alternative to the metal crown seals typically used to seal bottles containing carbonated beverages, yet can be made to have the ornamental appearance of a metal crown seal.

BRIEF DESCRIPTION OF THE DRAWINGS

The accompanying drawings, which are incorporated in and constitute part of this specification, are illustrative embodiments of the invention.

DETAILED DESCRIPTION OF THE DRAWINGS

Figure 1:
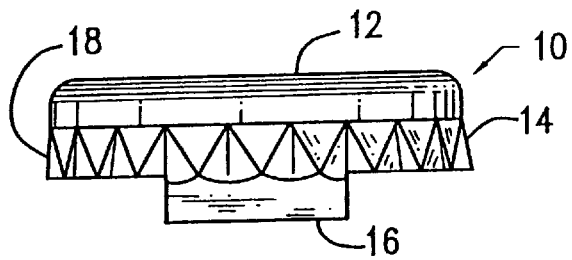
FIG. 1 is a front elevational view of one embodiment of the cap of the tamper evident closure of the present invention.
Figure 2:
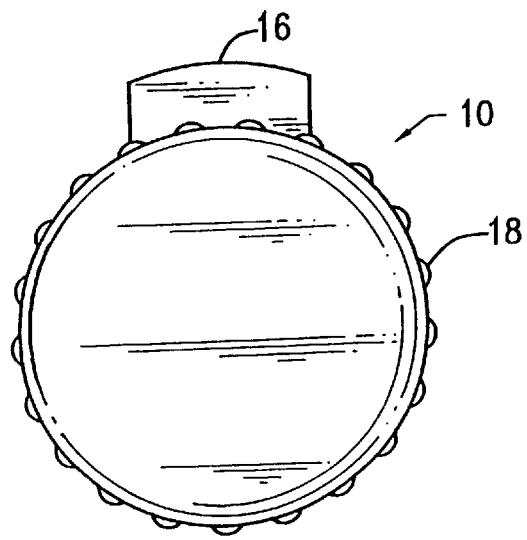
FIG. 2 is a plan view of the top of the cap of FIG. 1.
Figure 3:
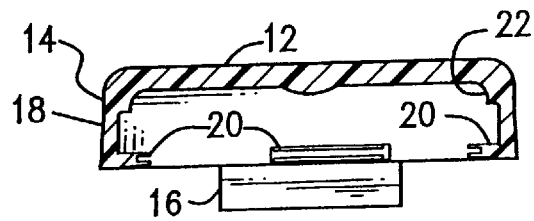
FIG. 3 is a front sectional view of the cap of FIG. 1.
Figure 4:
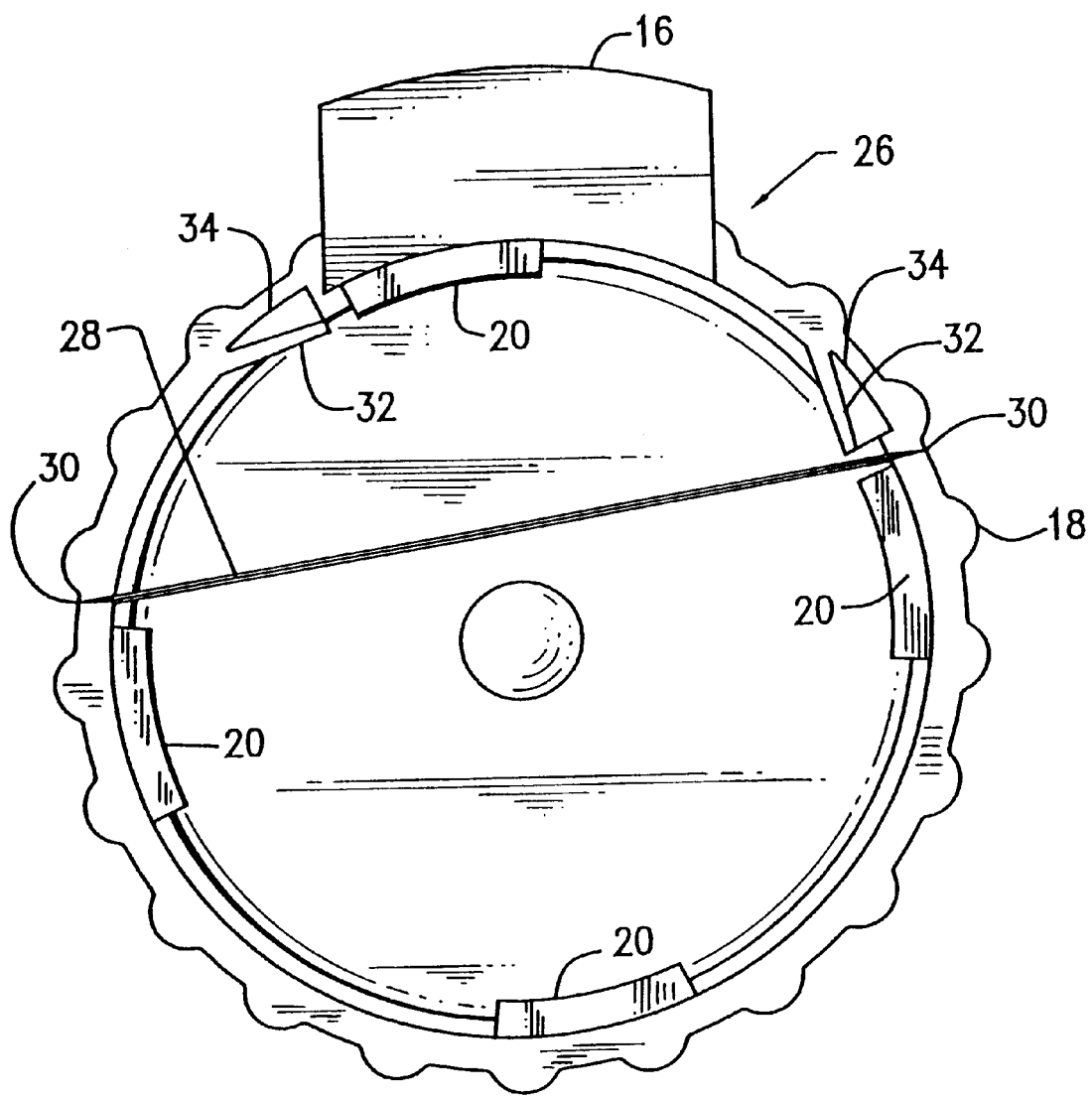
FIG. 4 is a plan view of the bottom of the cap of FIG. 1.

Referring now to FIGS. 1 to 4, there is shown a preferred embodiment of the cap of the tamper evident closure of the present invention. The cap 10 is made of plastic material and has a top portion 12, an annular depending skirt 14 and a handle 16. In the embodiment shown, the cap is made to have the appearance of a metal crown seal which typically is used to seal bottles containing carbonated beverages. Thus the depending skirt 14 includes a plurality of flutes 18 which serve no functional purpose but rather are solely ornamental. Such flutes may be included to provide the decorative appearance of a conventional metal crown seal.

The interior of the skirt 14 includes a plurality of projections or lugs 20 which extend inwardly from the bottom of the skirt 14. The cap 10 also includes a hinged portion 26 which functions to open the container upon which the cap is applied and to provide evidence that the container has been opened or tampered with. The hinged portion 26 includes the handle 16 of the cap, a hinge 28 which runs straight across the top portion 12 of the cap and two lines of weakness 30 in the depending skirt which run straight down the side of the skirt from the ends of the hinge to the bottom of the skirt. As will be explained further herein, the lines of weakness 30 will split when the hinged portion 26 is lifted by applying upward pressure on the handle 16. The hinge 28 is a weakened portion of the top portion 12 of the cap which allows the hinged portion 26 to be lifted upwardly from the container without separating the hinged portion 26 from the rest of the cap 10.

Preferably, the hinge 28 should be located in the top portion 12 of the cap at a point which allows about 150 degrees arc length of the top portion 12 to be included in the hinged portion 26 of the cap 10. The hinged portion 26 also includes flaps 32 which project inwardly from the interior wall 34 of the portion of the skirt 14 which forms part of the hinged portion 26. The flaps 32 are angled so as to sufficiently deflect toward the interior wall 34 when the cap is screwed onto a container neck to allow application and sealing of the cap onto the container. As will be described in detail below, the flaps 32 also function to prevent the cap from being unscrewed or twisted off the container when an attempt is made to unscrew the cap without first lifting the hinged portion 26 of the cap.

Figure 5:
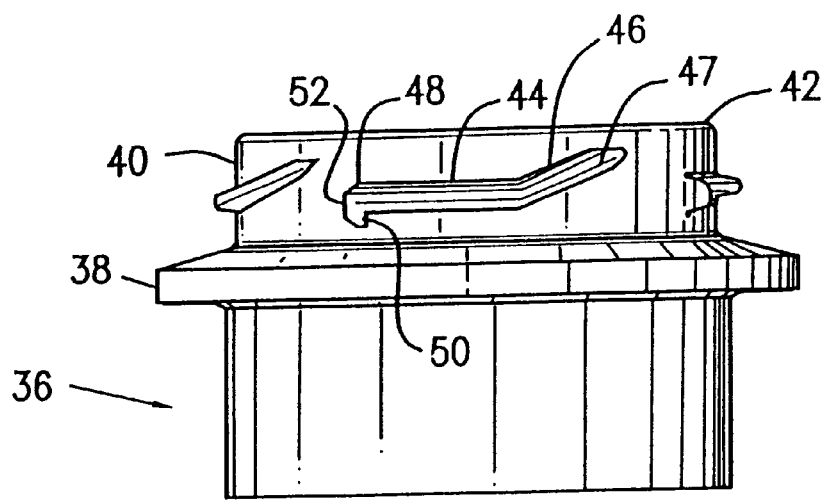
FIG. 5 is a front elevational view of a container, such as a bottle neck, upon which the cap of FIG. 1 can be applied.
Figure 6:
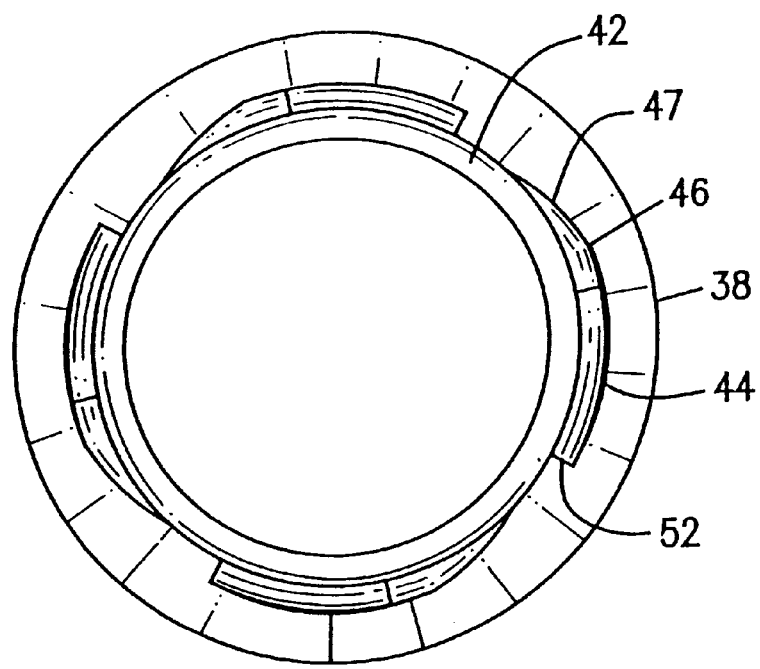
FIG. 6 is a plan view of the top of the container of FIG. 5.
Figure 10:
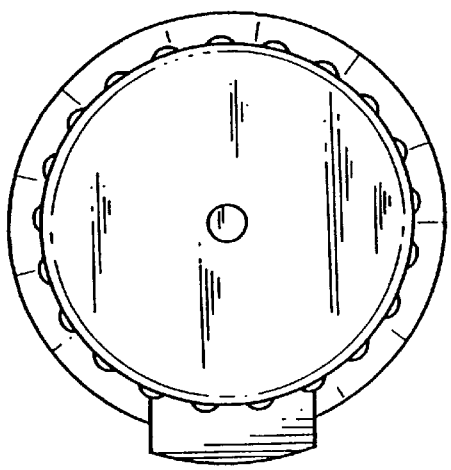
FIG. 10 is a plan view of the top of the cap of FIG. 1 on the container of FIG. 5.
Figure 9:
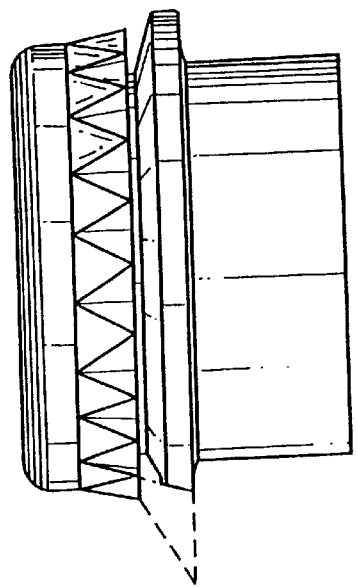
FIG. 9 is a side elevational view of the cap of FIG. 1 on the container of FIG. 5.
Figure 7:
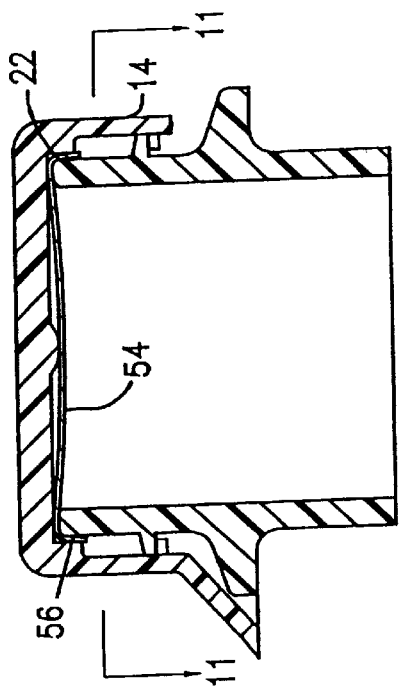
FIG. 7 illustrates the closing of the cap of FIG. 1 on the container of FIG. 5.
Figure 8:
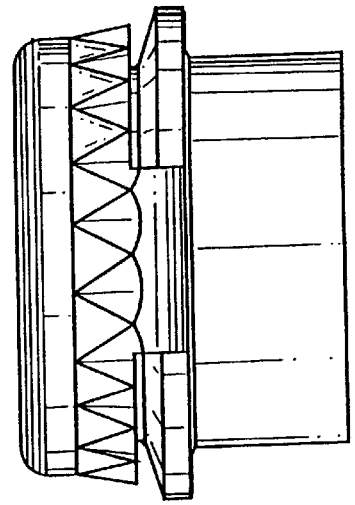
FIG. 8 is a front elevational view of the cap of FIG. 1 on the container of FIG. 5.

Referring now to FIGS. 5 and 6, there is shown two views of a preferred embodiment of the container which is used with the cap of the invention described and illustrated in FIGS. 1 to 4. The container of the present invention may be made of any suitable material, but is preferably made of plastic or glass. FIG. 5 shows the container neck 36 having a support ring 38 and an upper portion 40. The upper portion 40 includes an exterior retaining means in the form of a thread-like projection 44 which includes a lead-in portion 46 and a positive stopping portion 48 which includes stopping faces 50 and 52. As can be readily seen in FIG. 6 which illustrates a plan view of the top of the container, the lead-in portion 46 of the thread-like projection 44 preferably includes a sloped portion 47 which functions to allow easier application of the cap 10 onto the container neck 36, which is described in detail below.

FIGS. 7–11 show the cap of FIGS. 1–4 in closed and sealed engagement with the container neck 36 of FIG. 5 and 6. Prior to applying the cap 10 to the container neck 36, a liner 54 is placed in the cap between the lugs 20 and the top portion 10 of the cap. The liner preferably is made of ethylene vinyl acetate or other similar polyoelifins such as polyvinylchloride (PVC). The diameter of the liner preferably is about the same as the interior diameter of the depending skirt. To seal the container, the cap 10 of FIGS. 1–4 is screwed onto the upper portion 40 of the container neck 36. As the cap 10 is screwed onto the container neck 36, the lugs 20 of the cap engage the lead-in portion 46 of the thread-like projection 44 of upper portion 40 of the container neck, thus pulling the cap 10 onto the upper portion 40 of the container neck 36 until the leading edge of the cap lugs 20 meet the stopping face 50 of the stopping portion 48. As the cap is screwed onto the container, the flaps 32 of the skirt 14 of the cap deflect toward the interior wall 34 of the skirt 14 as they pass over the thread-like projection 44 of the container neck 36. When the cap 10 is pulled onto the upper portion 40 of the container neck 36, the liner 54 engages the rim 42 of the container neck. As the cap is screwed further onto the container for a sealing engagement, the outer circumference 56 of the liner 54 is caught and compressed between the rim of the container neck and the interior corner 22 of the cap where the top portion 10 meets the depending skirt 14, thus providing a gas-tight seal of the container.

Figure 11:
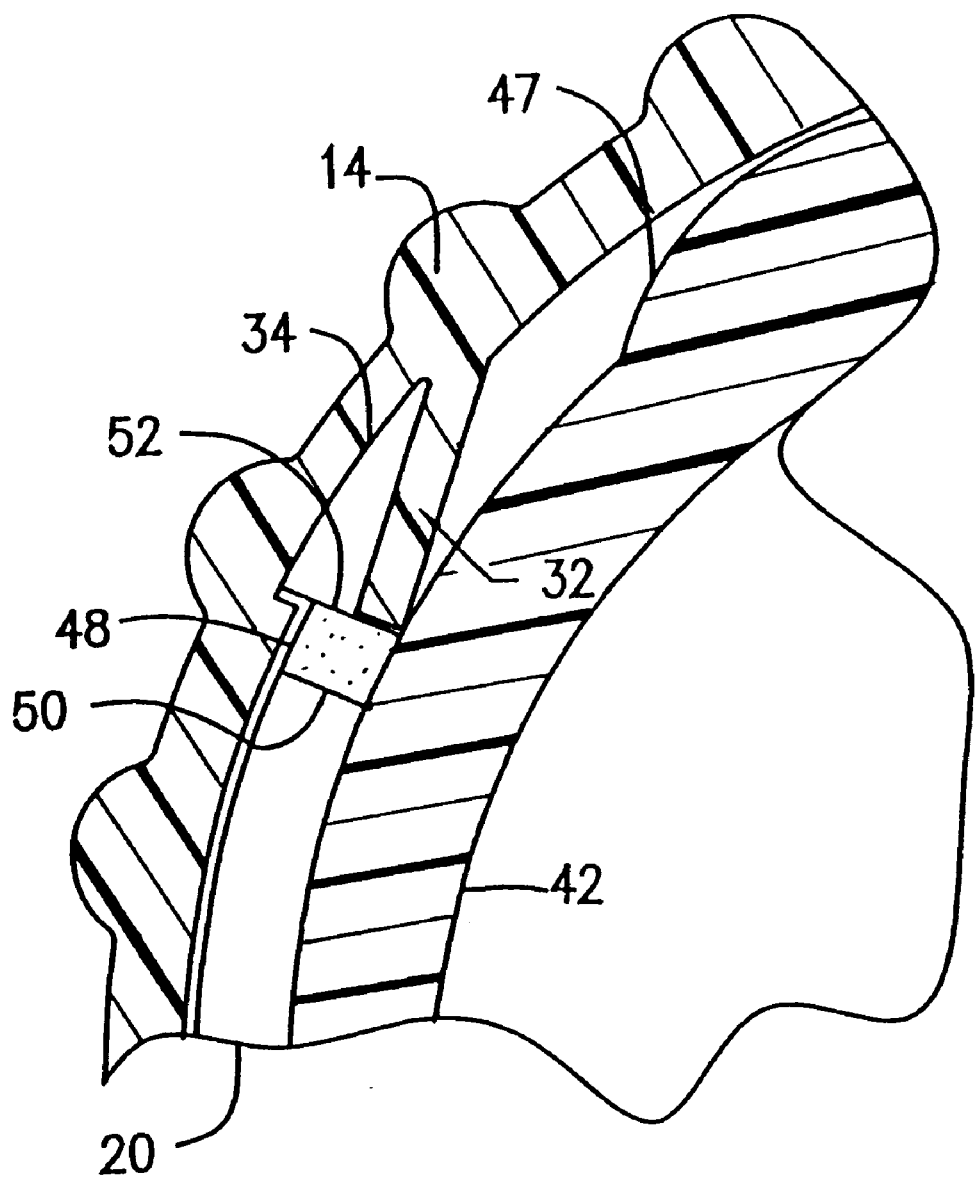
FIG. 11 is a partial plan view of FIG. 7, taken along lines 11—11 of FIG. 7.

As is shown most clearly in FIG. 11, after the cap is sealed onto the container neck 36, it may not be removed by simply unscrewing the cap from the container. After the cap 10 has been screwed onto the container, any attempt to unscrew the cap from the container neck 36 without first lifting the hinged portion 26 of the cap will cause the flaps 32 to engage the stopping face 52 of the thread-like projection 44, thus preventing unscrewing of the cap and unsealing of the container. As is further described below, the flaps 32 are disengaged only after the hinged portion 26 of the cap 10 is lifted from the container, thus opening the container and providing evidence that the container has been opened or tampered with.

Figure 12:
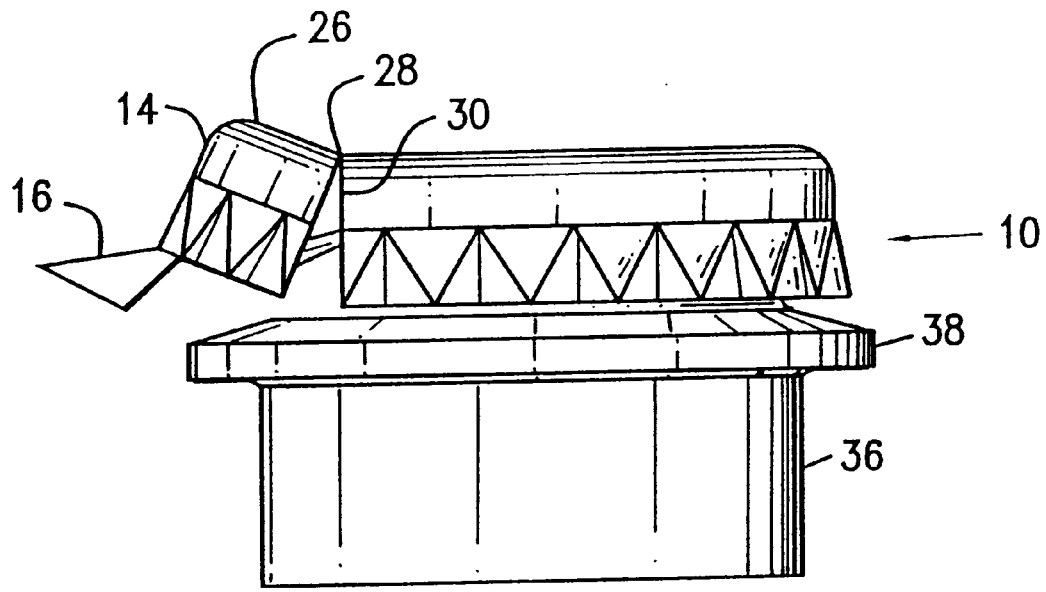
FIG. 12 is a front elevational view of the cap of FIG. 1 on the container of FIG. 5, wherein a hinged portion of the cap has been lifted, thus evidencing opening of or tampering with the container.
Figure 13:
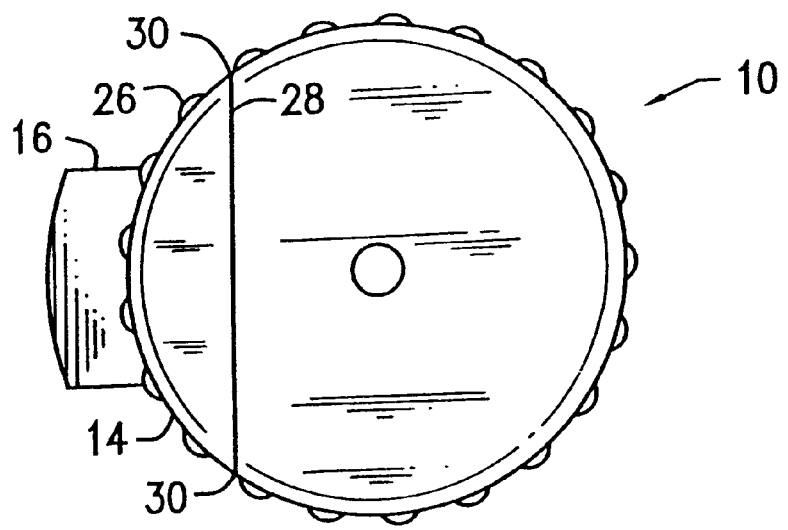
FIG. 13 is a top view of the cap and container of FIG. 12, illustrating the rotational movement required to remove the cap from the container after the hinged portion of the cap has been lifted as illustrated in FIG. 12.

Referring now to FIGS. 12 and 13, there is illustrated the opening of the closure of the present invention and the engagement of the tamper evidence means of the closure. As shown in FIG. 12, the closure of the present invention is opened by first pulling in an upward direction the handle 16 of the cap 10 with sufficient force to cause breakage of the lines of weakness 30 and bending of the hinged portion 26 about the hinge 28. As the handle 16 is pulled up, pressure from inside the container is released, evidence that the container has been opened is provided and, at the same time, the flaps 32 illustrated in FIGS. 4 and 11 which are included in the hinged portion 26 are disengaged. The disengagement of the flaps 32 allows the cap 10 to be completely unscrewed from the container as shown in FIG. 13, thus yielding a safe opening for the consumer. Even if the cap 10 is re-applied to the container, the two broken lines of weakness 30 will provide a clear and unequivocal indication that the container has been opened or tampered with.

The invention in its broader aspects is not limited to the specific described embodiments and departures may be made therefrom within the scope of the accompanying claims without departing from the principles of the invention and without sacrificing its chief advantages.

What is claimed is:

1. A container for containing a product comprising:
    (a) an opening for receiving or discharging the product;
    (b) a neck surrounding the opening;
    (c) said neck including exterior retaining means and positive stopping means;
    (d) said exterior retaining means comprising threads;
    (e) said positive stopping means comprising a continuation of the threads projecting in a direction substantially perpendicular to said threads and away from the opening of the container;
    (f) wherein the threads of the exterior retaining means comprise a plurality of distinct thread segments, each thread segment comprising a lead-in portion and a level portion and a free end;
        (i) said lead-in portion comprising a sloping portion of the thread segment connecting the free end of the thread segment to the level portion of the thread segment, wherein the free end is closer to the opening of the container than the level portion of the thread segment; and
        (ii) said level portion comprising a parallel portion of the thread segment, wherein the parallel portion is in a plane substantially parallel to the opening of the container.

2. The container of claim 1 wherein the threads of the exterior retaining means further comprise a plurality of distinct thread segments that do not overlap one another.

3. The container of claim 1 wherein the positive stopping means further comprise two stopping faces.

4. The container of claim 1 wherein the positive stopping means further comprise two substantially flat stopping faces.

5. A container for containing a product comprising:
    (a) an opening for receiving or discharging the product;
    (b) a neck surrounding the opening;
    (c) said neck including exterior retaining means and positive stopping means;
    (d) said exterior retaining means comprising threads;
    (e) said positive stopping means comprising a continuation of the threads projecting in a direction substantially perpendicular to said threads and away from the opening of the container;
    (f) wherein the positive stopping means further comprises two stopping faces.

6. A container for containing a product comprising:
(a) an opening for receiving or discharging the product;
(b) a neck surrounding the opening;
(c) said neck including exterior retaining means and positive stopping means;
(d) said exterior retaining means comprising threads;
(e) said positive stopping means comprising a continuation of the threads projecting in a direction substantially perpendicular to said threads and away from the opening of the container;
(f) wherein the positive stopping means further comprises two substantially flat stopping faces.

7. The container of claims 3, 4, 5, or 6, wherein the positive stopping means has two sides in planes perpendicular to the direction of rotation of the threads, and wherein one stopping face is located on one side and the other stopping face is located on the other side.

8. The container of claim 7, wherein the threads of the exterior retaining means further comprises a plurality of distinct thread segments that do not overlap one another.

* * * * *